No. 653,537. Patented July 10, 1900.
C. C. TANNERT.
SHOE LAST.
(Application filed Apr. 17, 1900.)
(No Model.)
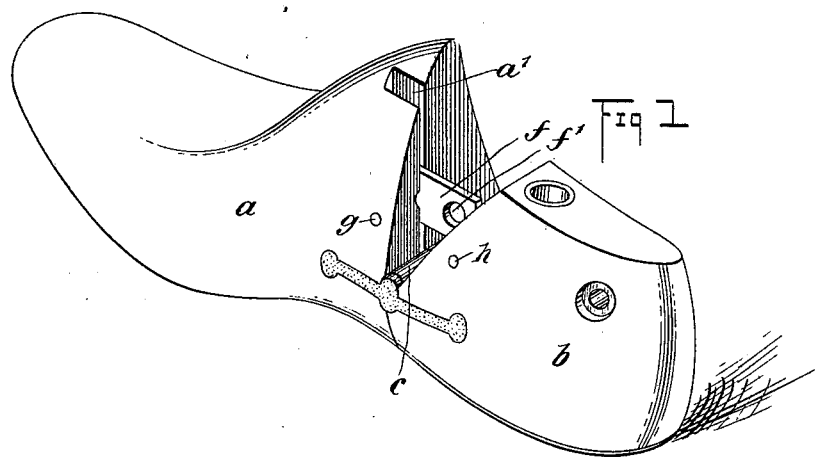
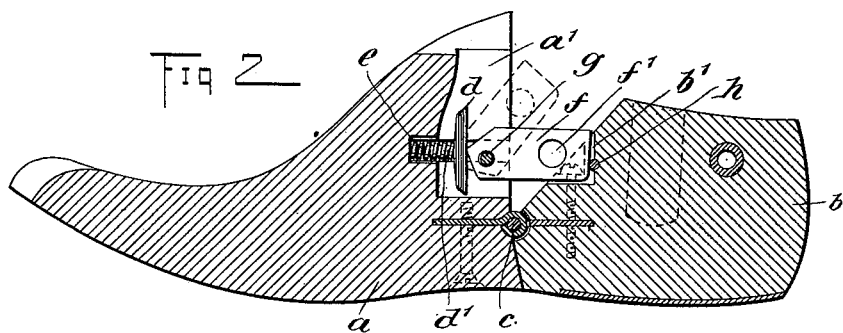
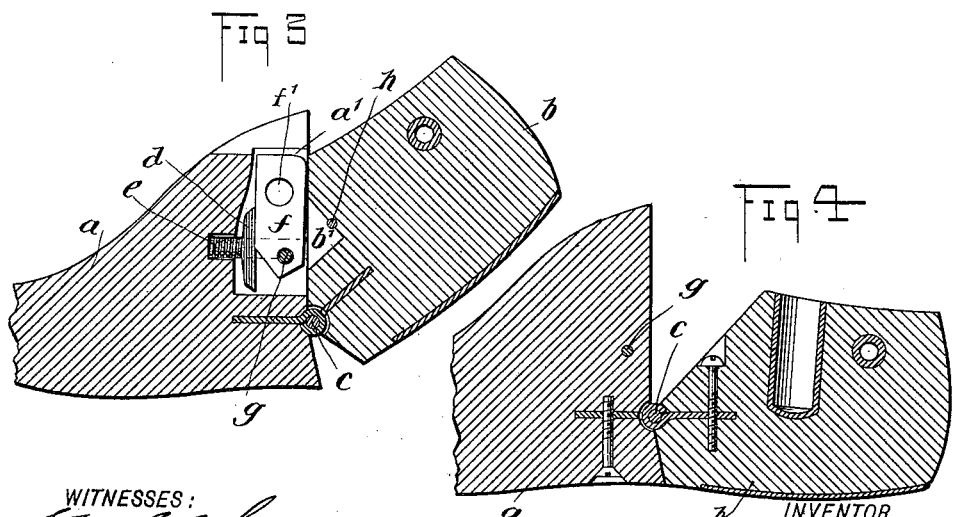
WITNESSES:
INVENTOR
Charles C. Tannert.
BY
ATTORNEYS

UNITED STATES PATENT OFFICE.

CHARLES C. TANNERT, OF NEW YORK, N. Y.

SHOE-LAST.

SPECIFICATION forming part of Letters Patent No. 653,537, dated July 10, 1900.

Application filed April 17, 1900. Serial No. 13,223. (No model.)

*To all whom it may concern:*

Be it known that I, CHARLES C. TANNERT, a citizen of the United States, and a resident of the city of New York, borough of Brooklyn, in the county of Kings and State of New York, have invented a new and Improved Shoe-Last, of which the following is a full, clear, and exact description.

The purpose of this invention is to provide means for removably holding the heel and toe sections of a shoe-last extended.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a perspective view of the invention. Fig. 2 is a longitudinal section showing by full lines my invention in operative position. Fig. 3 is a sectional view showing the sections of the last moved together, and Fig. 4 is a view illustrating particularly the manner in which the sections of the last are joined.

The toe-section $a$ and the heel-section $b$ are mounted to swing on each other in the usual manner by means of a hinge $c$, suitably fastened to the sections. The toe-section has a cavity $a'$ formed in the wall thereof, which is directly adjacent to the heel, and in this cavity is arranged to move longitudinally of the last a push-plate $d$. This plate has a shank $d'$, around which is coiled an expansive spiral spring $e$, serving to force the plate $d$ toward the heel. A dog $f$ is mounted on a stationary pin $g$, which is arranged in the cavity $a'$ just rearward of the push-plate $d$. The pin $g$ is located below the longitudinal center of the dog $f$ when the dog is in operative position, and the front end of the dog—that is to say, the end adjacent to the plate $d$—is formed with a double bevel, producing a point which is located above the horizontal center of the pin $g$ when the dog is in operative position. (See Fig. 2.) The dog $f$ has an orifice $f'$ formed therein, which serves to receive a suitable tool for throwing the dog up to the position indicated by dotted lines in Fig. 2 when desired. The heel portion $b$ of the last has a cavity $b'$ in its front wall to receive the free end of the dog $f$, and the heel portion is also provided with a stationary metallic pin or projection $h$, located in the rear wall of the cavity $b'$ and serving to be engaged by the free portion of the dog $f$, so as to form a bearing on the heel for the dog. Now it will be observed that when the dog $f$ is thrown up, as indicated by the dotted lines in Fig. 2, the upper bevel on the inner end of the dog will bear flat against the rear face of the push-plate $d$, and the dog will be held in this position by the action of the spring $e$. When the dog is thrown down, as shown by the full lines in Fig. 2, the spring $e$ will cause the plate $d$ to engage the point at the inner end of the dog, and this point being above the pin $g$ the plate $d$ will cause the dog to be thrown down at its free end, projecting such end into the cavity $b'$ and against the pin $h$, thus locking the heel in extended position. Now it will be observed that as the heel $b$ is moved downward on the hinge $c$ the dog $f$ follows the movement of the heel and prevents the operation thereof, since the dog is continually under the action of the spring $e$, and the slightest movement of the heel is taken up by the dog. To disengage the dog, it is simply necessary to throw it upward by inserting a tool in the orifice $f'$ or by any other convenient means. When the heel of the last is thrown up to its highest position, as shown in Fig. 3, it will engage the dog and move it from the position indicated by dotted lines in Fig. 2 to that shown by full lines in Fig. 3. Therefore it will be observed that the dog $f$ in no way hinders the full movement of the sections of the last.

Having thus described my invention, I claim as new and desire to secure by Letters Patent—

1. A shoe-last, having hingedly-connected heel and toe sections, the toe-section being formed with a cavity in its rear face, a push-plate mounted in the cavity, a spring engaging the push-plate and tending to move it rearward, and a dog mounted on a constant pivot in the cavity of the toe-section and having a pointed free end engaged by the push-plate, such point being situated above the pin, whereby to throw the free end of the dog downward into engagement with the heel.

2. A shoe-last having heel and toe sections hingedly connected, a horizontally-movable push-plate carried on one of the sections, a spring actuating the push-plate and pressing it toward the other section, and a dog mounted pivotally on the section carrying the push-plate and having its free portion movable into engagement with the other section, the dog lying horizontally when in active position and having a pointed end engaged by the push-plate and situated at one side of the pivot of the dog.

3. A shoe-last, having hingedly-connected heel and toe sections, the toe-section being formed with a cavity adjacent to the heel-section, and the heel-section having a cavity adjacent to the toe-section, a push-plate mounted in the cavity of the toe-section, a spring pressing the push-plate rearward, a dog having a pointed end engaged by the push-plate, and a pin carried in the toe-section, on which pin the dog is mounted, the pin being located below the pointed end of the dog, whereby the action of the push-plate throws the dog downward with its free end in the cavity in the heel-section, to removably hold the heel-section extended.

In testimony whereof I have signed my name to this specification in the presence of two subscribing witnesses.

CHARLES C. TANNERT.

Witnesses:
J. B. OWENS,
EVERARD BOLTON MARSHALL.